(12) United States Patent
Yamazaki

(10) Patent No.: US 7,971,667 B2
(45) Date of Patent: Jul. 5, 2011

(54) SYSTEM AND METHOD OF INHIBITING THE EFFECTS OF DRIVELINE BACKLASH IN A HYBRID PROPULSION SYSTEM

(75) Inventor: Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 568 days.

(21) Appl. No.: 11/788,419

(22) Filed: Apr. 19, 2007

(65) Prior Publication Data
US 2008/0257619 A1    Oct. 23, 2008

(51) Int. Cl.
*B60W 20/00* (2006.01)
(52) U.S. Cl. ............ 180/65.265; 180/65.285; 180/65.28
(58) Field of Classification Search ............... 180/65.28, 180/65.285, 65.265
See application file for complete search history.

(56) References Cited

U.S. PATENT DOCUMENTS

| | | | |
|---|---|---|---|
| 5,967,940 A | 10/1999 | Yamaguchi | |
| 6,332,504 B1 | 12/2001 | Adds | |
| 6,560,523 B2 * | 5/2003 | Kotwicki et al. | 701/54 |
| 6,574,535 B1 * | 6/2003 | Morris et al. | 701/22 |
| 6,604,591 B2 | 8/2003 | Bowen et al. | |
| 6,881,167 B2 * | 4/2005 | Inada | 475/5 |
| 6,945,347 B2 | 9/2005 | Matsuno | |
| 7,111,611 B1 * | 9/2006 | Lyon | 123/399 |
| 7,223,203 B2 * | 5/2007 | Yamazaki et al. | 477/15 |
| 7,275,518 B1 * | 10/2007 | Gartner et al. | 123/406.23 |
| 7,313,470 B2 * | 12/2007 | Zaremba et al. | 701/22 |
| 7,315,774 B2 * | 1/2008 | Morris | 701/53 |
| 7,446,426 B2 * | 11/2008 | Sheidler et al. | 290/40 A |
| 7,448,981 B2 * | 11/2008 | Mashiki | 477/3 |
| 7,565,938 B2 * | 7/2009 | Hisada et al. | 180/65.1 |
| 7,577,507 B2 * | 8/2009 | Morris | 701/51 |
| 7,605,561 B2 * | 10/2009 | Yamazaki et al. | 320/104 |
| 2006/0046893 A1 | 3/2006 | Yamazaki et al. | |

* cited by examiner

*Primary Examiner* — Jeffrey J Restifo
(74) *Attorney, Agent, or Firm* — David B. Kelley; Alleman Hall McCoy Russell & Tuttle LLP

(57) ABSTRACT

In a hybrid electric vehicle, a motor may be downstream of an engine and transmission. This configuration can be exploited by using the motor to buffer and control torque changes between the engine and the wheels, thereby reducing driveline backlash and clunk.

16 Claims, 6 Drawing Sheets

SYSTEM AND METHOD OF INHIBITING THE EFFECTS OF DRIVELINE BACKLASH IN A HYBRID PROPULSION SYSTEM

BACKGROUND AND SUMMARY

Backlash may potentially occur in a vehicle driveline when the torque transmitted through a mechanical contact (such as a set of gears) changes from positive to negative, or vice versa (ignoring acceleration effects). For example, when a vehicle is decelerating, the compression braking effect of the engine provides negative torque to the transmission which is then passed through the differential and then to the wheels. At this point, the driveline is wrapped in the negative direction. If the vehicle operator steps into the accelerator pedal, the transmitted engine torque switches from negative to positive as it begins to supply torque to propel the vehicle forward. The driveline unwraps as each driveline component changes from transmitting negative torque to transmitting positive torque. At some point during the transition, the entire driveline may be considered to be in a relaxed state with zero torque applied to the wheels. During this zero torque region, gear teeth in the transmission and other driveline elements may not be tightly coupled to their mating gears. As the engine continues to provide positive torque, the driveline will wrap in the positive direction. The gears are then quickly coupled to the corresponding mating gears which produces a "clunk". The driveline clunk may be sensed by the vehicle operator and the vehicle operator may perceive the clunk to objectionable In one approach, driveline backlash and clunk may be reduced by adjusting engine torque during a transition in torque transmission direction. In particular, the engine torque (which can be considered on the upstream side of the lash region) may be adjusted substantially slowly through the zero torque region of the transition in order to reduce wrapping of the driveline. Further, in a hybrid vehicle system, such as described in U.S. Pat. No. 6,574,535 for example, motor torque may be adjusted on the upstream side of the lash region to provide accurate control of the slower torque transition near the lash region to further reduce clunk.

However, the inventors herein have recognized some issues relating to the above approach. Specifically, in some conditions, since the propulsion source(s) are located upstream of the transmission and the gear elements where clunk may occur, the propulsion sources are slowly adjusted, especially through the zero torque region, in order to inhibit driveline backlash and clunk. By slowing the transition of torque transmission direction of the propulsion source, torque response to the wheels is also delayed. While various approaches can be used to minimize this delay, the delay is the fundamental features used to reduce clunk. As such, vehicle response may, in some cases, be perceived as sluggish by the vehicle operator.

In at least one approach described herein, at least some of the above issues may be addressed by a hybrid electric vehicle comprising: an internal combustion engine; a mechanical torque transmission device for transmitting engine torque to at least one wheel, the mechanical torque transmission device having a lash region; an electric energy conversion device connected downstream of the mechanical torque transmission device; and a control system, the control system, adjusting the electric energy conversion device to meet a desired vehicle response, adjusting the internal combustion engine torque to transition through the lash region, and then adjusting the electric energy conversion device torque and the internal combustion engine torque to meet the desired vehicle response. In this way, the hybrid vehicle may be controlled to provide a quick response to driver demand while reducing the NVH effects of driveline backlash. In other words, the smooth transition through the lash region can be provided without delaying the vehicle response since the motor is downstream of the lash region, and therefore can provide a rapid vehicle response without requiring a transition through the lash region. Rather, the transition may occur on a slower scale since it may be decoupled from the vehicle response.

Furthermore, the hybrid vehicle operating efficiency may be improved by performing engine and electric energy conversion device control according to the state of charge of the battery.

As another approach described herein, at least some of the above issues may be addressed by a method for inhibiting driveline backlash in a hybrid electric vehicle including an internal combustion engine providing torque along a driveline via a transmission, and an electric energy conversion device located downstream of the transmission configured to provide torque to the driveline is provided, the method comprising: adjusting the downstream electric energy conversion device to provide zero torque output during a zero torque region of a transition in engine torque transmission direction; and then adjusting the downstream electric energy conversion device to provide torque output corresponding to internal combustion engine torque output.

Since the electric energy conversion device is located downstream of the engine and transmission near the wheels, the electric energy conversion device may be used to buffer and control any sudden torque change between the engine and the wheels. Further, because the electric energy conversion device has very fast transient response, it can be used to prevent the driveline from storing energy and causing a spring effect. In this way, sudden changes between engine torque and wheel torque may be buffered, in turn, diminishing energy stored in the driveline that facilitates a reduction in driveline NVH and clunk.

DETAILED DESCRIPTION

Figure 1:
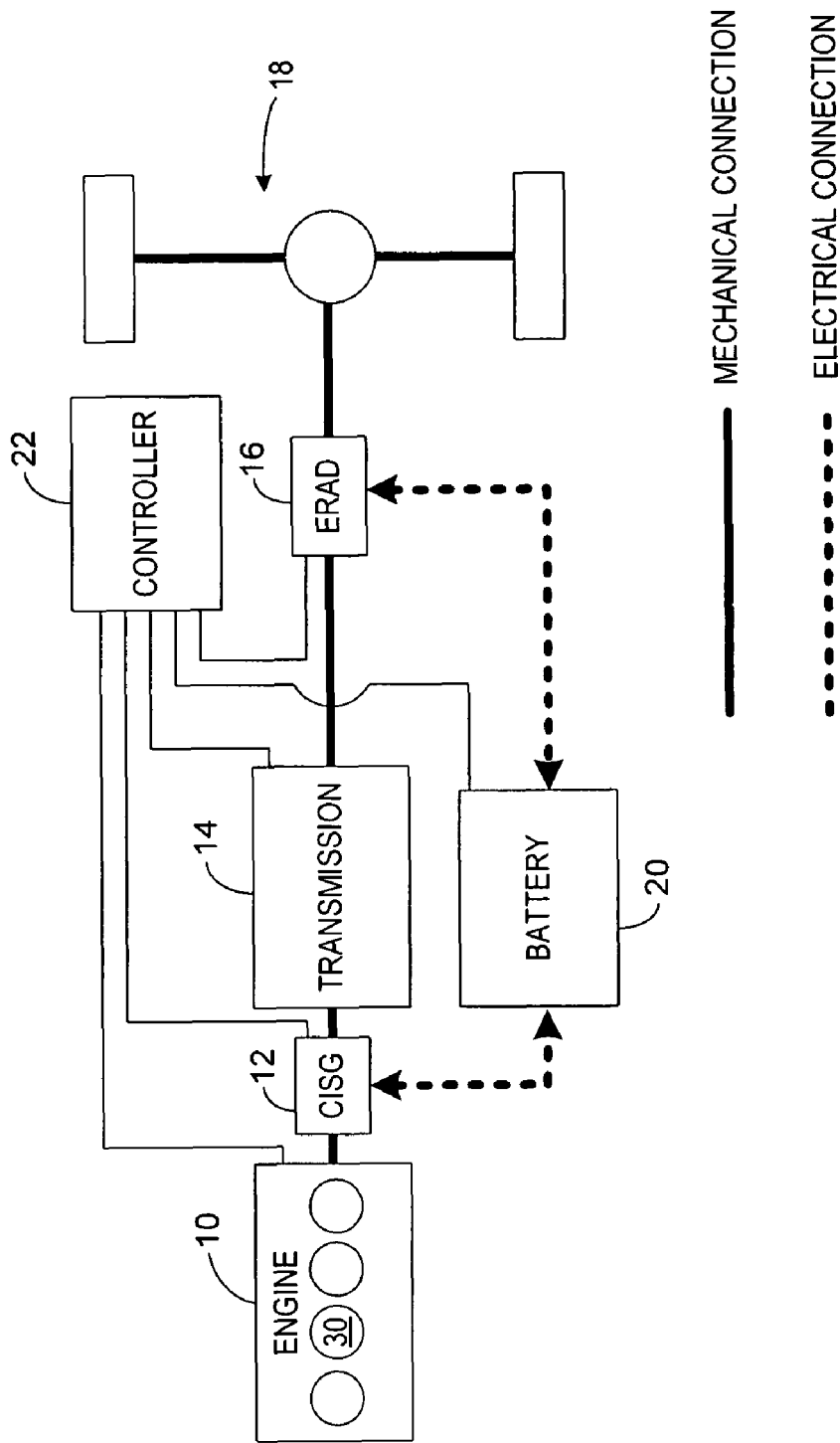
FIG. 1 shows a schematic diagram of a hybrid propulsion system of the present disclosure.

FIG. 1 illustrates an exemplary embodiment of a hybrid propulsion system for a vehicle. The hybrid propulsion configuration may be used with the disclosed approach for providing improved wheel torque response during a transition in torque transmission direction and inhibiting driveline backlash. In this example, the hybrid propulsion system may include an Atkinson cycle internal combustion engine (ICE) 10 having one or more cylinders 30, transmission 14, final drive/wheels 18 or other suitable device for delivering propulsive force to the ground surface, and two electric energy conversion devices 12 and 16. In some embodiments, transmission 14 may be a mechanical transmission device that includes gear elements.

Electric energy conversion devices 12 and 16 may operate as motors and convert electric energy into output torque. Further, electric energy conversion devices 12 and 16 may operate as generators and convert torque into electric energy. Note that electric energy conversion devices 12 and 16 may be referred to herein as at least one of a motor and a generator.

In one example, the first electric energy conversion device may be a crank integrated starter generator (CISG). CISG 12 may be connected at the output of engine 10 and further may be connected to transmission 14, thus providing starter/generator capabilities. In some embodiments, a torque converter may be disposed between the output of the CISG and the input of the transmission. The second electric energy conversion device may be an electric rear axle drive (ERAD) device. ERAD 16 may be coupled to the driveline downstream of the output of transmission 14 and may supply torque to final drive/wheels 18. In some embodiments, the ERAD may transmit torque to the driveline via a planetary gear set which may be connected to the final drive/wheels, thus providing propulsion capabilities in either an electric drive or hybrid drive mode. In some embodiments, the ERAD may transmit torque to the driveline via a belt or other suitable mechanism.

Electric energy conversion devices 12 and 16 may be in electric communication with battery 20. Under some conditions, electric energy conversion devices may generate output torque by converting electric energy supplied by the battery. In some embodiments, electric energy conversion devices 12 and 16 may be used as generators to convert mechanically generated power into electric power to be stored in the battery. It should be appreciated that in some configurations of the hybrid propulsion system the CISG electric energy conversion device may be omitted. Further, it should be appreciated that electric energy conversion devices 12 and 16 may be powered by sources other than the battery under some operating conditions. For example, IC engine 10 may generate power that may be used by the electric motors. Also, note in some embodiments, the ERAD may operatively communicate with gears configurations other than a planetary gear configuration.

In the illustrated configuration, the vehicle may be propelled by at least one of the engine or the motors. In this particular example, a rear wheel driveline configuration is shown, however it should be appreciated that other driveline configurations may be implemented, such as front wheel drive or all wheel drive. In other words, the IC engine, the CISG, and the ERAD may provide torque only to the front wheels. Alternatively, the three torque sources may provide torque to all of the wheels. In another example, the ERAD may generate torque to the front wheels and the CISG motor and IC engine may provide torque to the rear wheels or vice versa.

In some embodiments, the ERAD may be coupled downstream of the transmission. For example, the ERAD may be coupled directly to the output of the transmission. As another example, the ERAD may be coupled to the final drive/wheels. As yet another example, the ERAD may be coupled downstream of the transmission and may provide torque output via various gear sets, such as a planetary gear set, for example.

Note that the different torque sources may provide torque output to at least one of if not all of the wheels during various operating conditions. Moreover, in some embodiments, torque produced by the various torque sources may be distributed via different mechanical and/or electric paths to the different wheels based on various operating conditions.

While FIG. 1 shows one example hybrid propulsion configuration, various others may be used as noted herein. With regards to a full series type hybrid propulsion system, the engine may be operated to generate a form of energy suitable for use by the one or more motors. For example, with a full series type hybrid electric vehicle (HEV), the engine may generate electricity via a motor/generator that may be used to power an electric motor for propelling the vehicle. As another example, an engine may be operated to provide pump work to a hydraulic or pneumatic system that may be used to power a hydraulic or pneumatic motor for propelling the vehicle. As yet another example, an engine may be operated to provide kinetic energy to a flywheel or similar device for later application at the drive wheels.

With regards to a parallel type hybrid propulsion system, the engine and one or more motors may be operated independently of each other. As one example, an engine may be operated to provide torque to the drive wheels, while a motor (e.g. electric, hydraulic, etc.) may be selectively operated to add or remove torque delivered to the wheels. As another example, the engine may be operated without the motor or the motor may be operated without the engine.

Further, with either series or parallel type propulsion systems, or combinations thereof, an energy storage device may be included to enable energy generated by the engine and/or motor to be stored for later use by one or more motors. For example, a regenerative braking operation may be performed, where an electric energy conversion device (motor/generator) is used to convert kinetic energy at the drive wheels to a form of energy suitable for storage at the energy storage device. For example, with regards to a HEV, the motor or a separate generator may be used to convert torque at the wheels or torque produced by the engine into electric energy that may be stored at the energy storage device. A similar approach may be applied to other types of hybrid propulsion systems including hydraulic, pneumatic, or those including flywheels. Note that in some embodiments, separate motors and/or generators may be used to cooperatively generate electric power as well as output torque.

In the illustrated embodiment, electric energy conversion device 12 and electric energy conversion device 16 may be provided on each side of the transmission or on each side of a transmission element. In this example, one or more of electric energy conversion devices 12 and 16 may be operated to supply or absorb torque from the driveline with or without torque being provided by engine 10. Regenerative braking to charge battery 20 may be achieved with the configuration of FIG. 1 by transmitting torque from the drive wheels to electric energy conversion device 12 via the transmission, where electric energy conversion device 12 may perform an electric power generator function or alternatively electric energy conversion device 16 may perform an electric power generator function, further still a separate generator may be included. Still other configurations are possible. Therefore, it should be appreciated that other suitable hybrid configurations or variations thereof may be used with regards to the approaches and methods described herein.

An exemplary hybrid propulsion system may include one or more electronic control units shown as controller 22 to control operation of the hybrid driveline. As a non-limiting example, a controller may include microprocessor unit (CPU), input/output ports, an electronic storage medium (ROM), random access memory (RAM), keep alive memory (KAM), and a data bus among other components. The controller(s) may receive various signals from sensors distributed throughout the vehicle. A plurality of sensors may detect various operating conditions including engine and transmission operating conditions, battery and motor/generator operating conditions, and driver input, such as for example, engine speed (e.g. RPM), engine torque, CISG torque, ERAD torque, wheel torque, pedal position, battery state of charge, among others. The sensor signals may be processed and/or stored in the controller, and the controller may send various feedback control signals to actuators in the different vehicle systems based on calculations from the sensor signals in order to control vehicle operation.

In some embodiments vehicle operation may be controlled by a single electronic control unit. Further, in some embodiments different controllers may control different vehicle systems. For example, a controller may be designated to control aspects of the engine and/or transmission operation, while a different controller may be designated to control battery and electric power storage and output. In some embodiments, a vehicle may include a hierarchy of controllers which may collect, store, and process input signal information and further generate feedback control information. For example, one or more controllers may collect and store raw signal data and perform low level signal processing, such as signal enhancement, and various calculations. The processed signal data may be sent to one or more different controllers to perform additional processing and high level analysis as well as generate operational feedback. Alternatively, in some embodiments a single controller (or group of controllers) may control most if not all aspects of vehicle operation.

Figure 2:
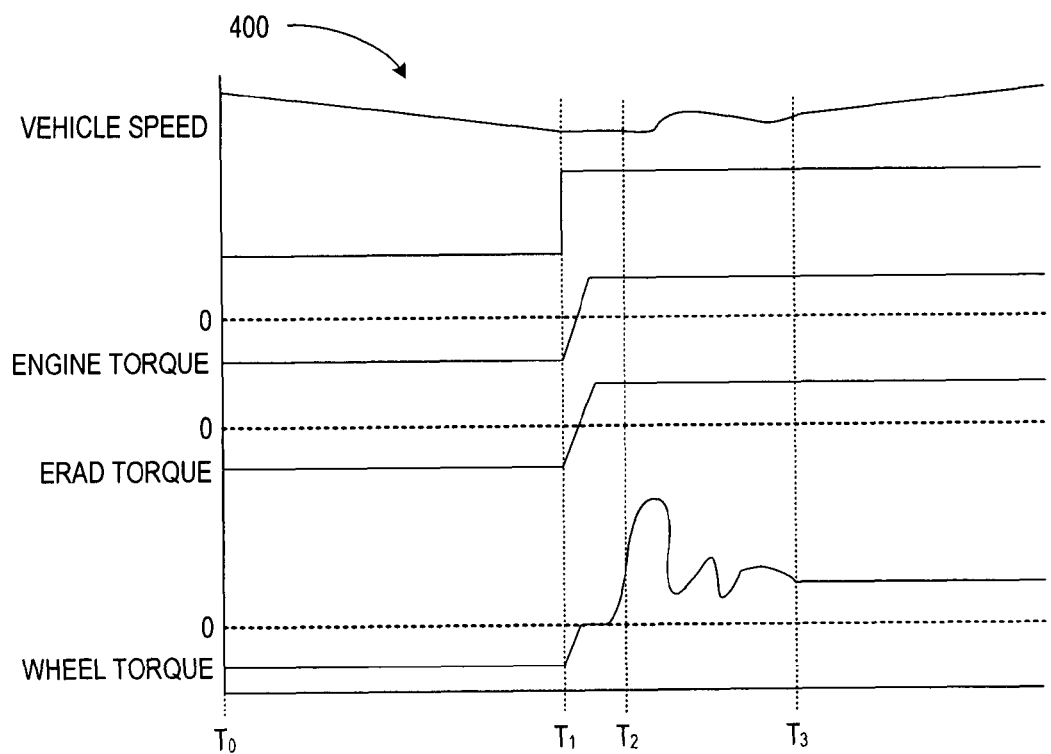
FIG. 2 graphically shows an example of driveline backlash that may occur during hybrid vehicle operation.

Referring now to FIG. 2, an example of driveline clunk at the onset of hybrid vehicle acceleration is illustrated graphically. In this example, operation of the hybrid vehicle is not adjusted to compensate for NVH (noise, vibration, harshness) considerations, such as driveline backlash and driveline clunk. Graph 200 plots vehicle speed, driver demand, engine torque, ERAD torque, and wheel torque over a period of time. At time segment $T_0$ to $T_1$, the driver demand is zero and the vehicle is decreasing. At $T_1$, accelerator tip-in occurs (e.g. the driver steps into the accelerator pedal). From $T_1$ to $T_2$, the hybrid vehicle driveline changes from supplying negative torque output as a result of deceleration to positive torque output to meet the increase in driver demand. Accordingly, engine torque and ERAD torque increase from $T_1$ to $T_2$. During this period of transition in torque transmission direction, a zero torque region may be realized where the driveline is not transmitting positive or negative torque, thus the driveline may be considered relaxed. Further, in this zero torque region (or lash region), the teeth of mating gears in the transmission and other driveline elements, for example the differential, may not be tightly coupled.

From $T_2$ to $T_3$, the engine may produce positive torque causing the driveline connected to the output shaft of the engine to be wrapped in the positive direction. As the driveline wraps in the positive direction spring force energy may be stored in the driveline. Further, as the driveline elements transition from a zero torque state to a positive torque state, the various gears may transition from being relaxed to tightly coupling one another. Thus, as the driveline transitions to transmitting positive torque, the spring force energy generated by the wrapping of the driveline may be released and exerted on the final drive/wheels resulting in increased NVH due to a surge in wheel torque followed by wheel torque oscillation. Further, the surge in wheel torque may generate a surge in vehicle speed. From $T_3$ forward, the gearing of the driveline elements and the driveline may tightly couple once again and positive torque may be supplied as desired.

Although the above example relates to backlash generated during a transition from deceleration to acceleration (e.g. accelerator tip-in), it should be appreciated that driveline backlash and clunk may be generated during a transition from acceleration to deceleration (e.g. accelerator tip-out).

In the above discussed example, the change in engine and ERAD torque from negative torque output to positive torque output is performed without consideration for driveline backlash created from the spring force generated in the driveline as a result of gear elements becoming unlashed during the transition in torque transmission direction. Driveline backlash produces a clunk condition when the gear elements knock against one another as the driveline becomes unwrapped. The clunk condition may create a substantial increase in NVH perceived by the driver. Moreover, driveline backlash may create undesired wheel torque oscillation as well as a surge in vehicle speed during the transition in torque transmission direction. The surge in vehicle speed and wheel torque may create a noticeable reduction in driver control.

Thus, in order to overcome these issues and maintain drivability during a transition in torque transmission direction, an approach is described herein for reducing driveline backlash in a hybrid vehicle configuration that includes a motor (e.g., ERAD) located downstream from an engine and transmission. The method may control torque output of the ERAD to buffer torque applied to wheels during a torque transition period in order to inhibit or reduce wheel torque oscillation and surges in vehicle speed while facilitating smooth coupling of the driveline to the wheels after the change in torque direction.

As will be appreciated by one of ordinary skill in the art, the specific routines described below in the flow diagrams may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated acts or functions may be repeatedly performed depending on the particular strategy being used. Further, these figures may graphically represent code to be programmed into the computer readable storage medium in a controller.

Figure 3:
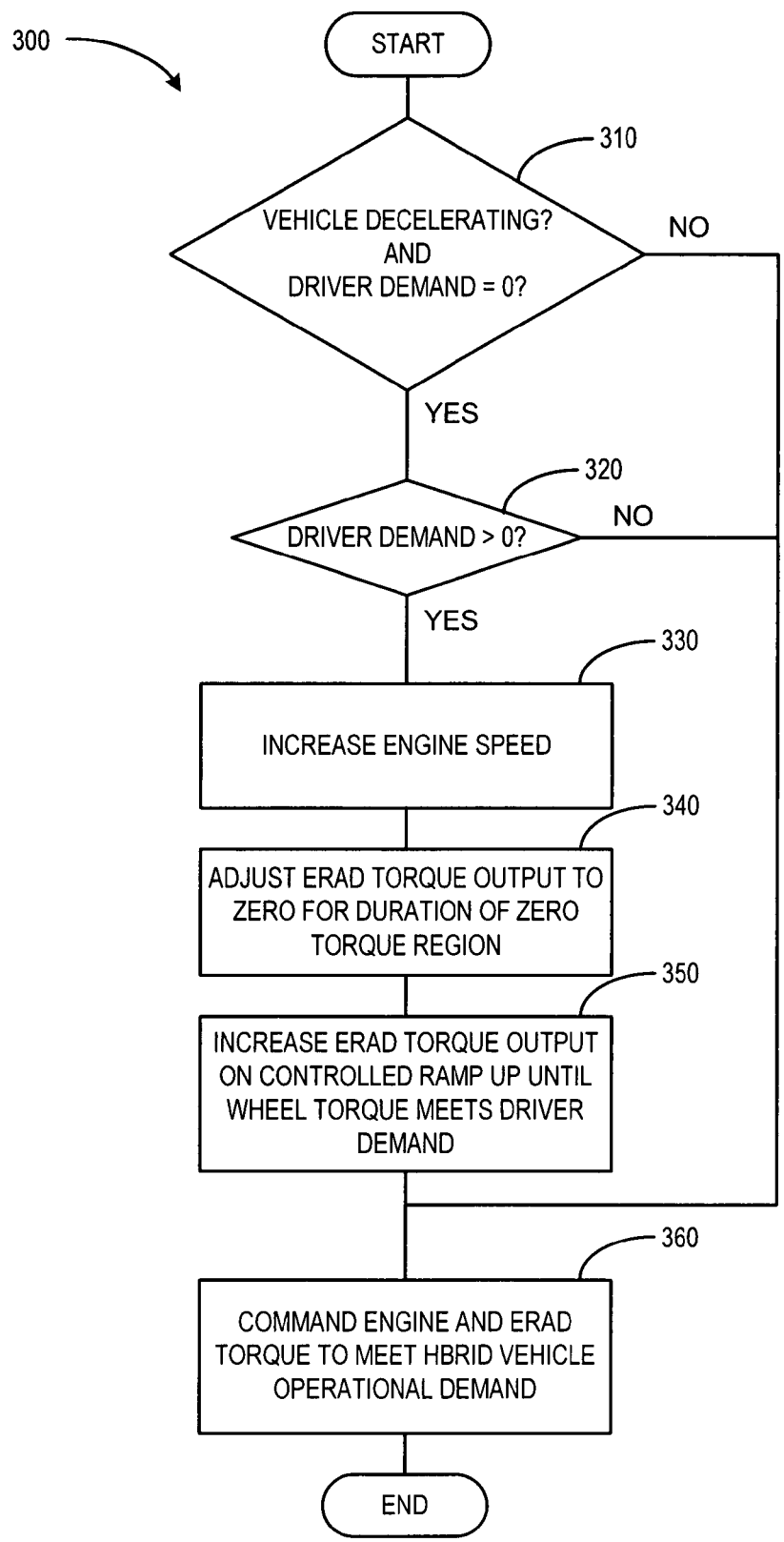
FIG. 3 shows a flow diagram of a control routine for inhibiting driveline backlash in the hybrid propulsion system of the present disclosure.

Referring now to FIG. 3, a routine is described for detecting a vehicle deceleration condition where driveline backlash may occur and for controlling the hybrid driveline to reduce or eliminate the potential driveline backlash. In particular, routine 300 may include adjusting the ERAD torque output responsive to detection of a transition from providing negative torque to providing positive torque in the driveline in order to prevent a driveline clunk condition from occurring. Further, since the ERAD is positioned downstream of the transmission, the ERAD may absorb changes in torque direction which may reduce oscillations in wheel torque and vehicle speed due to driveline backlash.

Routine 300 begins at 310 where it is determined if the vehicle is in a deceleration condition. In one non-limiting example, the deceleration condition may be determined based on a change in engine speed. If it is determined that the vehicle is not in a deceleration condition, the routine continues with standard operation and moves to 360. Otherwise, routine 300 moves to 320.

At 320, it may be determined if driver demand is greater than zero. In other words, it may be determined if a tip-in of the accelerator pedal is detected. In one example, accelerator pedal tip-in may be detected based on a pedal position measured by a pedal position sensor. If it is determined that driver demand is not greater than zero the routine moves to 360 and continues standard operation. Otherwise, a potential drivel backlash condition has been detected and pre-wrap driveline adjustments may be performed beginning at 330.

At 330, the engine speed (e.g. engine RPM) may be increased based on the driver demand. Increasing the engine speed may, in turn, change the direction of the engine output torque from negative torque to positive torque so that the vehicle output may meet driver demand. As discussed above, increasing the engine speed to change the direction of output torque may produce a transition period where a zero torque region or a region where the gearing elements may become unlashed is created in the driveline. As engine speed is increased and positive torque is created, the driveline may be wrapped creating a spring force in the driveline. In order to prevent driveline backlash as the driveline unwraps, the ERAD may absorb the torque force of the wrapped driveline so that it is not transferred to the wheels. Accordingly, at 340, the ERAD may be adjusted to maintain zero torque output to the rear driveline and correspondingly providing zero torque to the wheels during the zero torque region in order to inhibit driveline backlash. In other words, the ERAD may be adjusted to control the driveline so that it is allowed to change torque direction without substantially affecting the wheel torque.

The ERAD may be adjusted to maintain zero torque output for a specified duration that corresponds to the zero torque region and may be determined in a variety of ways. For example, the ERAD may be adjusted to provide zero torque output for a time duration that is proportionate to the driver demand. In one particular example, ERAD adjustment may be based on pedal position as measured by an accelerator pedal position sensor. In this case, driver demand may be an indicator of how long the zero torque region may exist during the torque transition. As another example, the ERAD may be adjusted to provide zero torque output for a predetermined period of time that is calibrateable. Time calibration may be based on vehicle speed, for example. As yet another example, the ERAD may be adjusted to provide zero torque output until the zero torque region is no longer sensed. In one particular example, the zero torque region may be sensed using torque sensor or speed sensors that may sense the output torque of the transmission and/or the input torque of the ERAD.

Next at 350, after the zero torque region has ended, the driveline may be unwrapped and synchronized with the ERAD so that torque may be transmitted to the wheels. Thus, the ERAD may be adjusted to provide positive torque output to the wheels in a smooth fashion. In particular, the commanded ERAD torque output may be adjusted according to a controlled ramp up until wheel torque meets driver demand. By ramping up the ERAD torque output, torque may be slowly applied to the wheels so that the driveline may become tightly coupled without harsh transition or driveline clunk.

The ERAD torque output may be increased in a variety of ways. For example, the ERAD may be adjusted to provide torque output that ramps at a rate that is proportionate to the driver demand. In one particular example, ERAD adjustment may be based on pedal position as measured by an accelerator pedal position sensor. In this case, driver demand may be used to determine a ramp rate of the ERAD torque output. As another example, the ERAD be adjusted to provide torque output ramp up for a predetermined period of time that is calibrateable. Time calibration may be based on vehicle speed, for example. As yet another example, the ERAD may be adjusted to provide increased torque output until it is sensed that wheel torque meets driver demand.

At 360, standard hybrid operation resumes and the engine and ERAD may be adjusted to produce torque output to meet hybrid vehicle operation. It should be appreciated that routine 300 may be repeated numerous times throughout hybrid vehicle operation in order to inhibit driveline backlash. In this way, the approaches described above with reference to FIG. 3 may be used to reduce excitation of the driveline during transitions in torque output in order to inhibit driveline backlash and clunk conditions.

Figure 4:
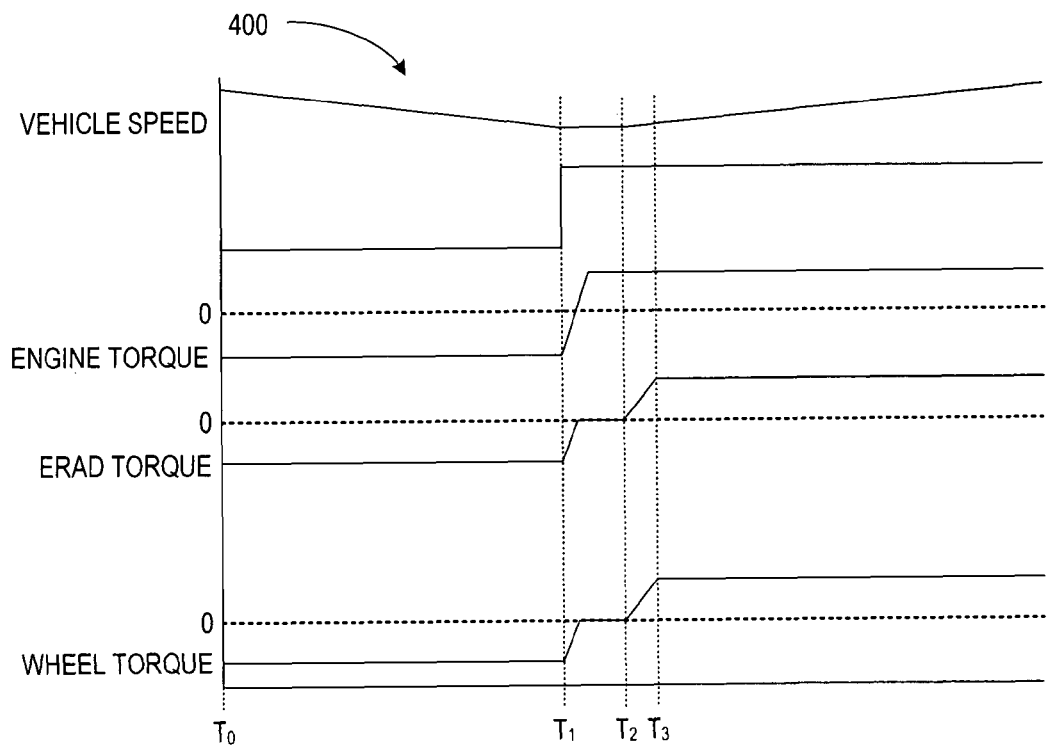
FIG. 4 graphically shows an example of inhibiting driveline backlash during hybrid vehicle operation according to the routine of FIG. 4.

Referring now to FIG. 4, an example of ERAD operation to control driveline backlash and reduce driveline clunk at the onset of hybrid vehicle acceleration is illustrated graphically.

Graph 400 plots vehicle speed, driver demand, engine torque, ERAD torque, and wheel torque over a period of time. At time segment $T_0$ to $T_1$, the driver demand is zero and the vehicle is decreasing. At $T_1$, accelerator tip-in occurs (e.g. the driver steps into the accelerator pedal). From $T_1$ to $T_2$, the hybrid vehicle driveline changes from supplying negative torque output as a result of deceleration to positive torque output to meet the increase in driver demand. Accordingly, engine torque increases from $T_1$ to $T_2$. Between $T_1$ and $T_2$ a zero torque region exists in the driveline and the ERAD is adjusted to produce zero torque output and hold the rear of the driveline or the wheels at zero torque for the duration of the zero torque region. Thus, between $T_1$ and $T_2$, wheel torque is zero.

From $T_2$ to $T_3$, the ERAD torque output ramps up to meet the engine supplied torque, thus enabling the front of the driveline to unwrap in a controlled fashion. In contrast to FIG. 2, as shown between $T_2$ and $T_3$ the wheel torque ramps up smoothly without a surge in vehicle speed or wheel torque. Further, from $T_3$ forward, the vehicle accelerates as desired. Thus, by using the ERAD to buffer torque transmission to the wheels during a transition in torque direction according to the routine described above, the driveline may be tightly coupled to the wheels in a smooth fashion and oscillations in wheel torque and vehicle speed as well as driveline clunk may be inhibited.

Figure 5:
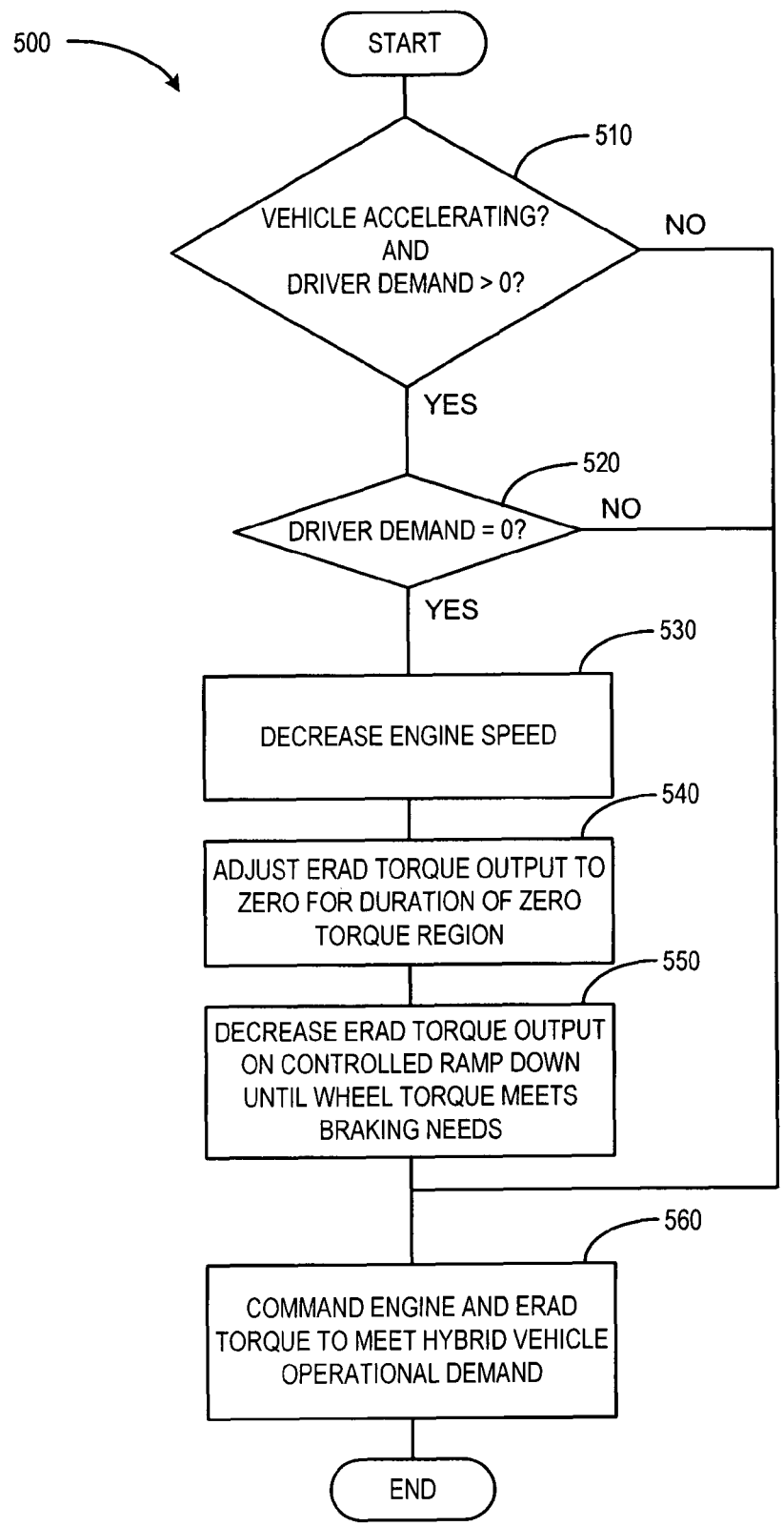
FIG. 5 shows a flow diagram of another control routine for inhibiting driveline backlash in the hybrid propulsion system of the present disclosure.

Referring now to FIG. 5, a routine is described for detecting another vehicle condition where driveline backlash may occur and for controlling the hybrid driveline to reduce or eliminate the potential driveline backlash. In particular, routine 500 may detect a condition where a hybrid vehicle driveline may transition from providing positive torque output to providing negative torque output. As an example, this condition may occur when a driver is accelerating at a high rate then substantially stops accelerating by lifting their foot off of the accelerator pedal. During this condition, driveline backlash may occur since the driveline transitions from providing positive torque to providing negative torque. Thus, routine 500 may include adjusting the ERAD torque output responsive to detection of a transition from providing positive torque to providing negative torque in the driveline in order to prevent a driveline clunk condition from occurring. Further, by adjusting the ERAD torque output oscillations in wheel torque and vehicle speed may be inhibited.

Routine 500 begins at 510, where it is determined if the hybrid vehicle is accelerating and the driver demand is greater than zero. This condition may be considered an acceleration condition. If it is determined that the hybrid vehicle is not operating in the acceleration condition the routine moves to 560 and standard hybrid operation continues. Otherwise, if it is determined that the hybrid vehicle is operating in the acceleration condition, routine 500 moves to 520.

At 520, it is determined if driver demand is zero. By determining that driver demand is zero during the acceleration condition a change in torque direction may be detected (e.g. driveline torque transitions from positive torque output to negative torque output). If it is determined that driver demand is not zero the routine moves to 560 and standard hybrid operation continues. Otherwise, if it is determined that driver demand is zero, routine 500 moves to 530.

At 530, engine speed maybe decreased for engine braking purposes to slow the hybrid vehicle. In some cases, regenerative braking may be performed for battery charging purposes.

As discussed above, decreasing the engine speed to change the direction of output torque may produce a transition period where a zero torque region is created in the driveline. As engine speed is decreased and negative torque is created, the driveline may be wrapped which may result in driveline backlash as the force of the wrapped driveline is transferred to the wheels. Thus, at 540, the ERAD may be adjusted to maintain zero torque output to the rear driveline and correspondingly providing zero torque to the wheels during the zero torque region in order to inhibit driveline backlash. In other words, the ERAD may be adjusted to control the driveline so that it is allowed to change torque direction without substantially effecting the wheel torque.

Next at 550, after the zero torque region has ended, the driveline may be unwrapped or released and the ERAD may be adjusted to provide negative torque output to the wheels in a smooth fashion. In particular, the commanded ERAD torque output may be adjusted according to a controlled ramp down until wheel torque meets engine torque. By ramping down the ERAD torque output, negative torque may be slowly applied to the wheels so that the driveline may become tightly coupled without harsh transition or driveline clunk.

At 560, standard hybrid operation resumes and the engine and ERAD may be adjusted to produce torque output to meet hybrid vehicle operation. It should be appreciated that routine 500 may be repeated numerous times throughout hybrid vehicle operation in order to inhibit driveline backlash.

In this way, the approach described above may be used to reduce excitation of the driveline during transitions in torque transmission direction. In particular, since the ERAD motor is positioned downstream of the transmission and gear elements that may generate a clunk, the ERAD may be adjusted to buffer torque to the wheels during the transition in torque transmission direction so that driveline backlash and clunk may be inhibited on a timescale that does not necessarily restrict vehicle performance.

In another approach, the fast transient response characteristics of the ERAD may be advantageously applied to improving wheel torque response during a transition in torque transmission direction while inhibiting driveline backlash. In particular, during a transition in torque transmission direction, the ERAD motor may be adjusted to provide a desired torque to the wheels quickly while facilitating the relatively gradual transition in torque transmission direction of the engine so that driveline wrap may be decoupled from wheels and backlash may be absorbed causing NVH and clunk to be substantially reduced. Further, the approach may consider the state of charge of the battery when providing wheel torque response.

Figure 6:
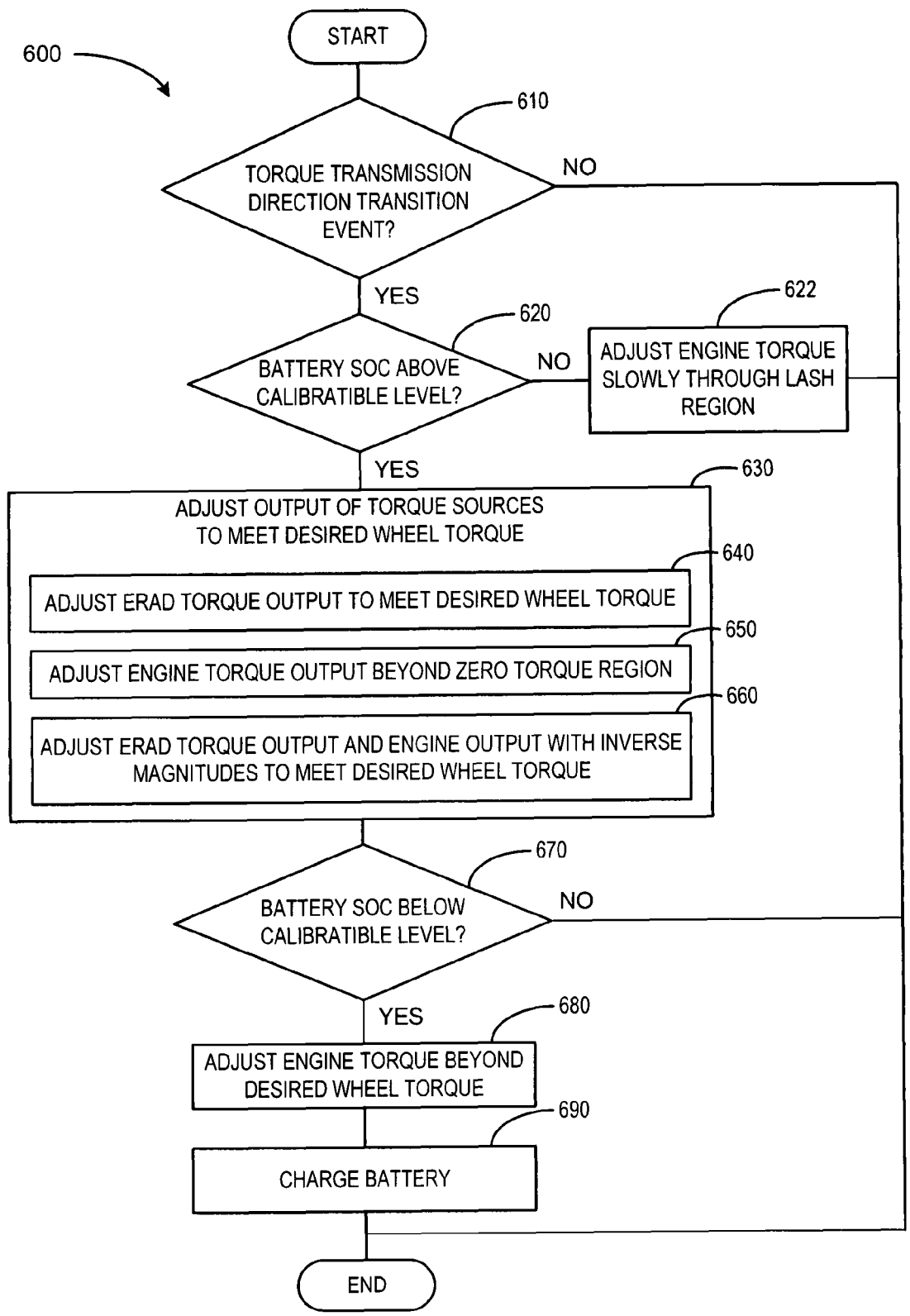
FIG. 6 shows a flow diagram of a control routine for providing improved wheel torque and inhibiting driveline backlash during a transition in torque transmission direction.

Referring now to FIG. 6, a routine is described for providing improved wheel torque response during a transition in torque transmission direction. Routine 600 begins at 610 where it may be determined if an engine torque transmission direction transition event is occurring. In one example, a torque transmission direction transition event may include a transition from providing negative torque to providing positive, such as during a transition from vehicle deceleration to vehicle acceleration. Accordingly, the torque transition may be detected in a variety of ways including, for example, measuring vehicle acceleration and driver demand parameters. If it is determined that a torque transmission direction transition event is occurring routine 600 moves to 620. Otherwise, routine 600 ends.

At 620, it may be determined if the state of charge (SOC) of the battery is above a calibrateable level. If the battery SOC is low (or below the calibrateable level) then the ERAD may not be powered sufficiently to provide a desired wheel torque response. The SOC level may be calibrated based on various operating conditions. In one example the SOC level may be calibrated based on desired wheel torque. For example, if the desired wheel torque is low the SOC level may be calibrated to a lower level. If it is determined that the battery SOC is below the calibrateable level, then routine 600 moves to 622 and the wheel torque response may be provided by the engine. In this situation driveline backlash and/or clunk may occur or the engine may transition slowly through the lash region to reduce NVH effects. Otherwise, if the battery SOC is above a calibrateable level routine 600 moves to 630.

At 630, the torque sources may be adjusted to provide the desired wheel torque. 630 may include torque source adjustments to inhibit driveline excitation exerted on the wheels. In particular, at 640, the ERAD may be adjusted to provide torque output to meet the desired wheel torque. Since the ERAD is positioned downstream from the engine and transmission, the ERAD may provide torque output in a quick manner that is decoupled from the engine transition of torque transmission direction. Thus, a delay in wheel torque response as a result of buffering engine torque through a zero torque region of the driveline may be eliminated to improve wheel torque response.

Next at 650, the engine torque may be adjusted beyond a zero torque region or adjusted to through a lash region to a point where the driveline components may be tightly coupled. In some cases, engine torque may be increased from providing negative torque output to providing positive torque output. In some cases, engine torque may be decreased from providing positive torque output to providing negative torque output. Since the engine torque transition is decoupled from the output of the ERAD, the engine torque may be adjusted at a rate that facilitates smooth transition through the zero torque region. In particular, the engine torque may be adjusted at different rates or along different response curves according to various operating parameters such as the desired wheel torque, for example.

Next at 660, the ERAD torque output and the engine torque output may be adjusted in cooperation to meet the desired wheel torque. In some embodiments, the desired wheel torque may be based on driver demand. The hybrid driveline may be configured such that the engine may provide torque to the final drive/wheels via the driveline at a higher operating efficiency than the ERAD. As such, the engine torque may be adjusted to provide substantially all of the desired wheel torque. In cases where the desired wheel torque is positive torque, the engine output torque may be increased to the desired positive wheel torque and the ERAD torque may be decreased to zero. In cases where the desired wheel torque is negative, the engine output torque may be decreased to the desired negative wheel and the ERAD torque may be increased to zero.

In some embodiments, the engine torque may be adjusted at a greater rate than before the engine torque leaves the zero torque region or passes through the lash region since the gear elements of the driveline are tightly coupled. In some embodiments, the torque adjustment of the ERAD and engine may correlate to inverse rates (e.g. slopes) or inverse response curves. In this way, the ERAD and engine may be adjusted to provide the desired wheel torque in an efficient manner without driveline backlash affecting the wheel torque.

Next at 670, it may be determined if the battery SOC is below a calibrateable level. The ERAD may use an amount of electric energy to provide the desired wheel torque response and the battery SOC may be lowered. Thus, the battery SOC may be read to determine if the battery needs to be charged. If it is determined that the battery SOC is above a calibrateable level, routine 600 ends. Otherwise, routine 600 moves to 680.

At 680, the engine may be adjusted to provide torque beyond the desired wheel torque. The additional engine torque may be directed to one of the electric energy conversion device to be converted to electric energy. Accordingly, at 690, the electric energy may be stored in the battery and the battery may be charged. In this way, a torque response may be provided to meet a desired wheel torque while facilitating a smooth transition of the torque transmission direction of the engine that substantially eliminates driveline backlash on the wheels. In particular, since the ERAD is positioned downstream from the engine and transmission, the ERAD may provide output torque that is decoupled from the engine output torque, thus, creating time for the engine to smoothly transition through a change in torque transmission direction. It should be appreciated that the above described routine may be performed numerous times throughout operation of the hybrid propulsion system.

In some embodiments, the CISG may be adjusted to facilitate smooth transition of the torque transmission direction of the engine and reduce driveline backlash. In particular, the CISG torque may be adjusted to reduce the spring force of the driveline between the output of the CISG and the input of the ERAD. Further, as engine torque is adjusted the CISG torque may be correspondingly adjusted to enable tight coupling of the driveline gear elements. By controlling the torque at the input (e.g. CISG output torque) and the output (e.g. ERAD input torque) of the transmission, the driveline may be wrapped to a lesser degree and the gear elements of the driveline may be lashed easily due to a smaller torque difference. In other words, the coordinated adjustment of the two electric energy devices may provide time for the engine to transition through a change torque transmission direction. Further, in some embodiments, the adjustment of CISG torque may be based on the SOC of the battery.

It should be appreciated that according to the above described approach engine speed may be adjusted to accommodate the transition in torque transmission direction. Accordingly, the above described routine may include adjusting engine speed based on at least one of the direction of the torque transmission and the desired wheel torque. More particularly, the engine speed may be adjusted at a first rate during a first engine torque adjustment period and then the engine speed may be adjusted at a second rate different from the first engine speed adjusted during a second engine torque adjustment period.

Figure 7:
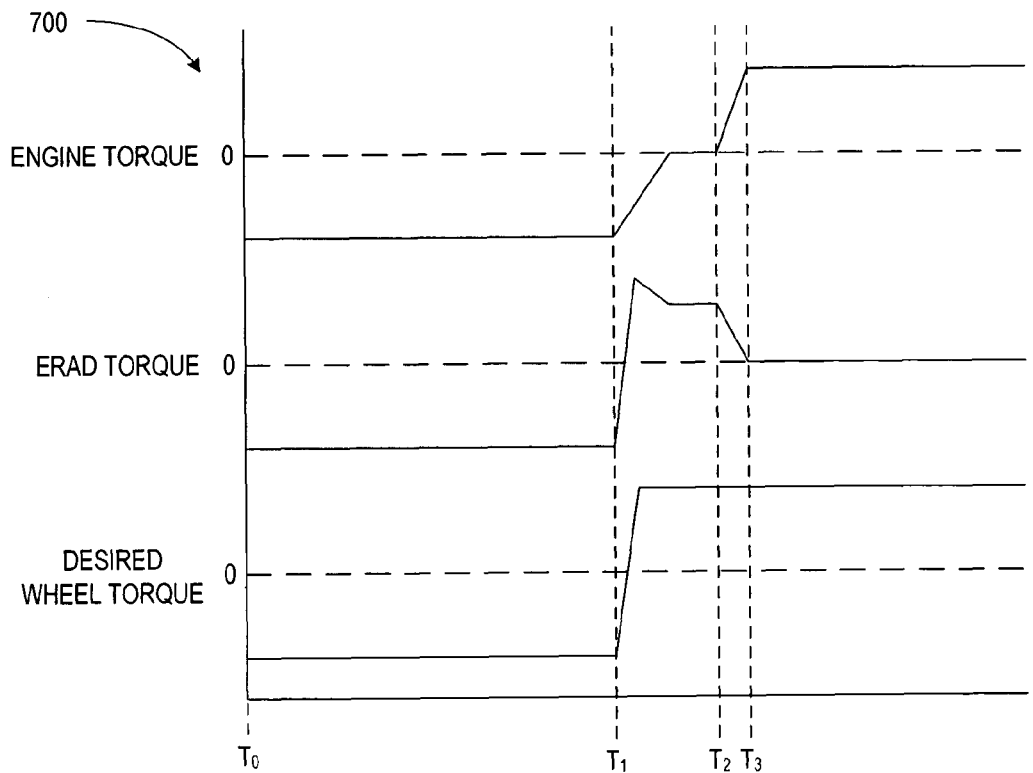
FIG. 7 graphically shows an example of providing wheel torque response during a transition in torque transmission direction according to the routine of FIG. 6.

Referring now to FIG. 7, an example of ERAD and engine operation to provide a desired wheel torque response and to inhibit driveline backlash and driveline clunk during a transition in torque transmission direction is illustrated graphically. Graph 700 plots desired wheel torque, ERAD torque, and engine torque over a duration of time. Between $T_0$ and $T_1$, the desired wheel torque, the ERAD torque, and the engine torque is negative. At $T_1$, the desired wheel torque increase from negative torque to positive torque. Between $T_1$ and $T_2$, the ERAD torque is increased to provide a torque response that meets the desired wheel torque and the engine torque is increased through the zero torque region at a rate decoupled from the ERAD torque. At $T_3$, the wheel torque has been increased through the zero torque region or the lash region to where the driveline gear elements are tightly coupled together. Between $T_2$ and $T_3$, the engine torque is increased to meet the desired wheel torque. Simultaneously, the ERAD torque is decreased corresponding to the increase in engine torque. From $T_3$, the engine torque meets the desired wheel torque and the ERAD torque is decreased to zero and standard hybrid vehicle operation resumes.

Note that although the ERAD and engine torques are shown changing at linear rates, it should be appreciated that the ERAD and engine torques may be adjusted at varying rates and may be adjusted according to various other response curves.

Figure 8:
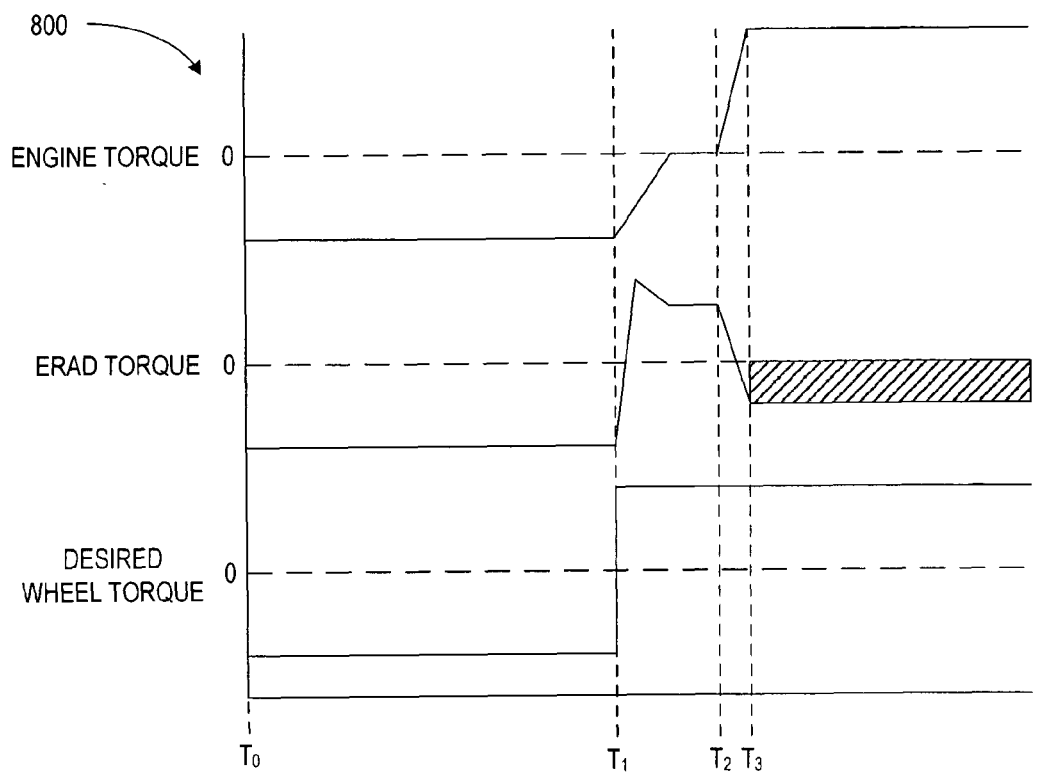
FIG. 8 graphically shows another example providing of wheel torque response during a transition in torque transmission direction according to the routine of FIG. 6.

Referring now to FIG. 8 the example of FIG. 7 is modified to include an example of controlling the ERAD and engine for battery charging purposes after a transition of torque transmission direction. Graph 800 plots desired wheel torque, ERAD torque, and engine torque over a duration of time. At $T_3$, the engine torque is increased beyond the desired wheel torque. Correspondingly, the ERAD torque is decreased in accordance with the engine torque increase to convert the additional engine torque into electric energy to be stored in the battery. The adjusted torque regions are highlighted by a diagonal hatched region to represent battery charging operations.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid electric vehicle comprising:
   an internal combustion engine;
   a mechanical torque transmission device for transmitting engine torque to at least one wheel, the mechanical torque transmission device having a lash region;
   an electric energy conversion device connected between the mechanical torque transmission device and the wheel; and
   a control system, the control system adjusting the electric energy conversion device from negative to positive torque without a lash region transition delay to meet a desired vehicle response, and then adjusting torque of the internal combustion engine with engine torque limited to transition through the lash region while counteracting the limited engine torque with an inversely adjusted torque of the electric energy conversion device, and then further adjusting torque of the electric energy conversion device and the torque of the internal combustion engine to meet the desired vehicle response.

2. The hybrid electric vehicle system of claim 1 wherein the limited torque of the internal combustion engine is adjusted from negative to positive torque.

3. The hybrid electric vehicle of claim 1 wherein the control system is configured to adjust the electric energy conversion device based on a state of charge of a battery that supplies electric energy to the electric energy conversion device.

4. The hybrid electric vehicle of claim 3 wherein the control system is configured to adjust the electric energy conversion device during the transition when a battery state of charge is above a calibrateable state of charge level, wherein the calibrateable state of charge level is calibrated based on a desired wheel torque.

5. The hybrid electric vehicle of claim 3 wherein the control system adjusts the torque of the internal combustion engine beyond the desired vehicle response before limiting engine torque; and adjusts the electric energy conversion device to convert at least some torque of the internal combustion engine to electric energy to charge the battery after completing the transition through the lash region.

6. The hybrid electric vehicle of claim 1 wherein the control system is configured to adjust the torque of the internal combustion engine at a first rate through the lash region and is configured to adjust the torque of the internal combustion engine at a second rate different from the first rate beyond the lash region.

7. The hybrid electric vehicle of claim 1 further comprising:
a second electric energy conversion device coupled between an output of the internal combustion engine and an input of the mechanical torque transmission device; and
the control system configured to adjust torque of the second electric energy conversion device based on the torque of the internal combustion engine.

8. The hybrid vehicle of claim 1 wherein the control system is configured to adjust the internal combustion engine speed based on at least one of a direction of torque transmission and a desired wheel torque.

9. The hybrid electric vehicle of claim 1 wherein the desired vehicle response is based on a driver demand.

10. A method for a hybrid-electric vehicle comprising: an engine, and an electric motor/generator located between a transmission and a wheel, comprising:
before transitioning through a transmission lash region, increasing motor/generator torque faster than an engine torque increase; then
decreasing motor/generator torque inversely with a continued slower engine torque increase to provide zero torque output change during the transition; and then
further decreasing an amount of motor/generator torque based on a battery state of charge.

11. The method of claim 10 wherein the lash region is detected based on at least one of a torque sensor and a speed sensor.

12. The method of claim 10 wherein the motor/generator is adjusted to provide zero torque output change for a predetermined duration.

13. The method of claim 10 wherein the motor/generator is adjusted to provide zero torque output change for a duration based on driver demand.

14. A method for a hybrid-electric vehicle including an engine coupled via a transmission to a wheel, and a motor/generator positioned between the transmission and the wheel, comprising:
during a transition through a transmission lash region, adjusting the motor/generator to provide a driver-demanded desired torque to the wheel transitioning from negative to position torque at a higher rate without delay while transitioning engine torque transmission direction at a slower rate with delay.

15. The method of claim 14 wherein the motor/generator is transitioned to charge a battery of the hybrid-electric vehicle once the engine provides positive torque to the wheel.

16. The method of claim 14 wherein the transition through the transmission lash region includes transitioning to providing positive torque through the transmission from the engine to the wheel, and wherein the motor/generator is adjusted to provide a higher rate rapid increase in torque than the slower rate transition in engine torque, where the transition in engine torque more gradually increases engine torque from negative to positive than the motor/generator provides the rapid increase in torque, and where after the motor provides the higher rate rapid increase, the driver-demanded desired torque is adjusted inversely to the engine torque through the lash region.

* * * * *